Nov. 10, 1959 G. R. BROWN 2,911,990
VALVE HAVING MANUAL AND AUTOMATIC MEANS FOR OPERATING IT
Filed May 27, 1955 8 Sheets-Sheet 1

INVENTOR.
GEORGE ROBERT BROWN
BY Arthur H. Swanson
ATTORNEY.

Nov. 10, 1959            G. R. BROWN            2,911,990
VALVE HAVING MANUAL AND AUTOMATIC MEANS FOR OPERATING IT
Filed May 27, 1955            8 Sheets-Sheet 2
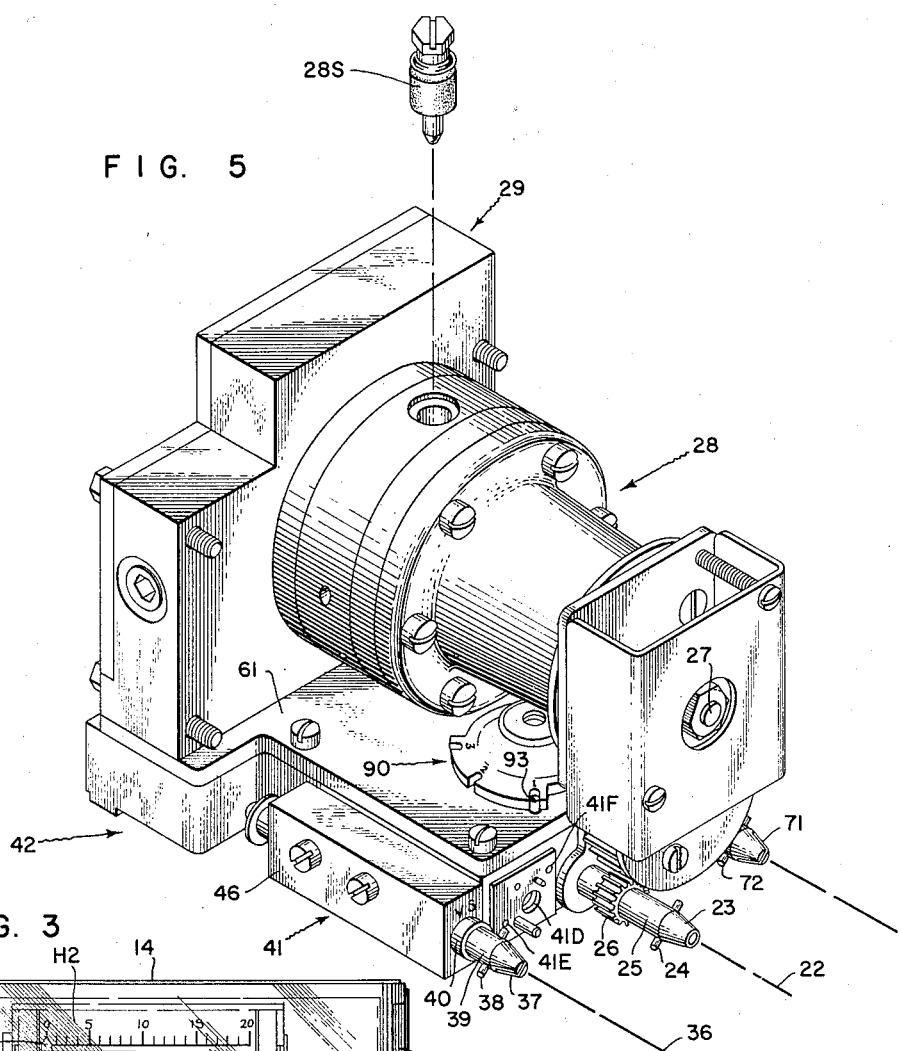
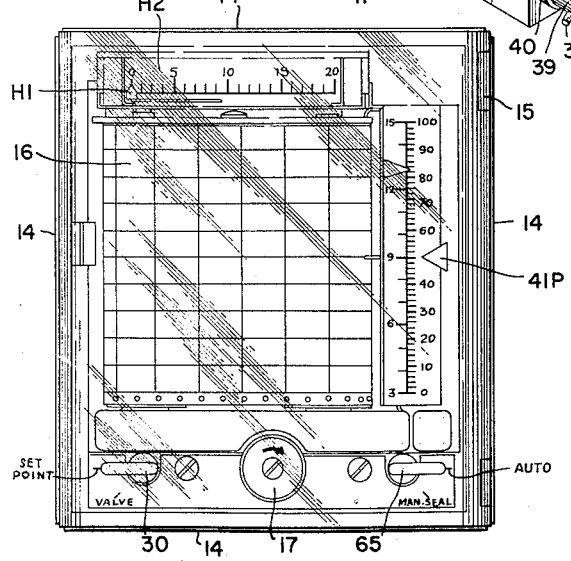
INVENTOR.
GEORGE ROBERT BROWN
BY Arthur H. Swenson
ATTORNEY.

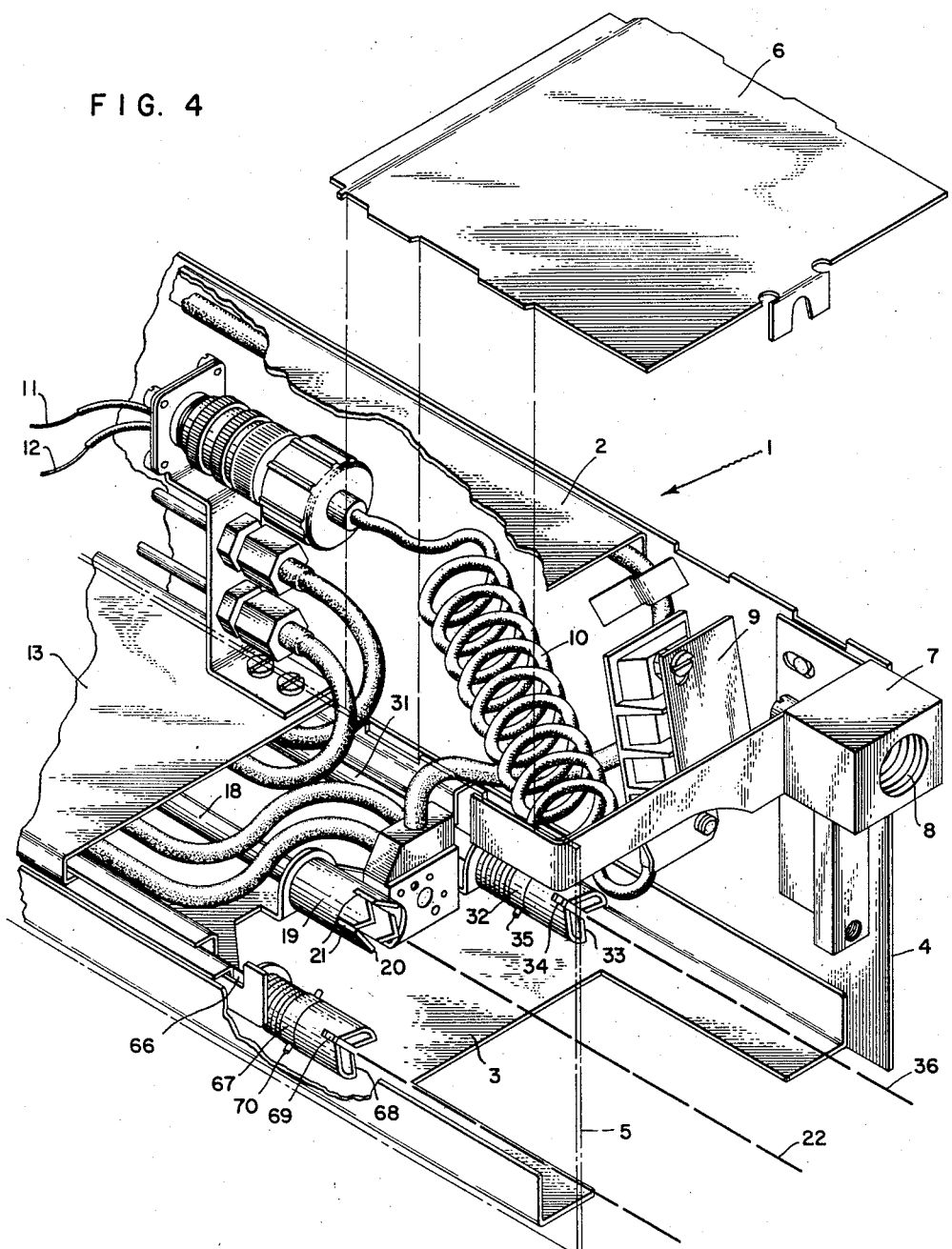

INVENTOR.
GEORGE ROBERT BROWN
BY Arthur H. Swenson
ATTORNEY.

Nov. 10, 1959 G. R. BROWN 2,911,990
VALVE HAVING MANUAL AND AUTOMATIC MEANS FOR OPERATING IT
Filed May 27, 1955 8 Sheets-Sheet 5

INVENTOR.
GEORGE ROBERT BROWN
BY
ATTORNEY.

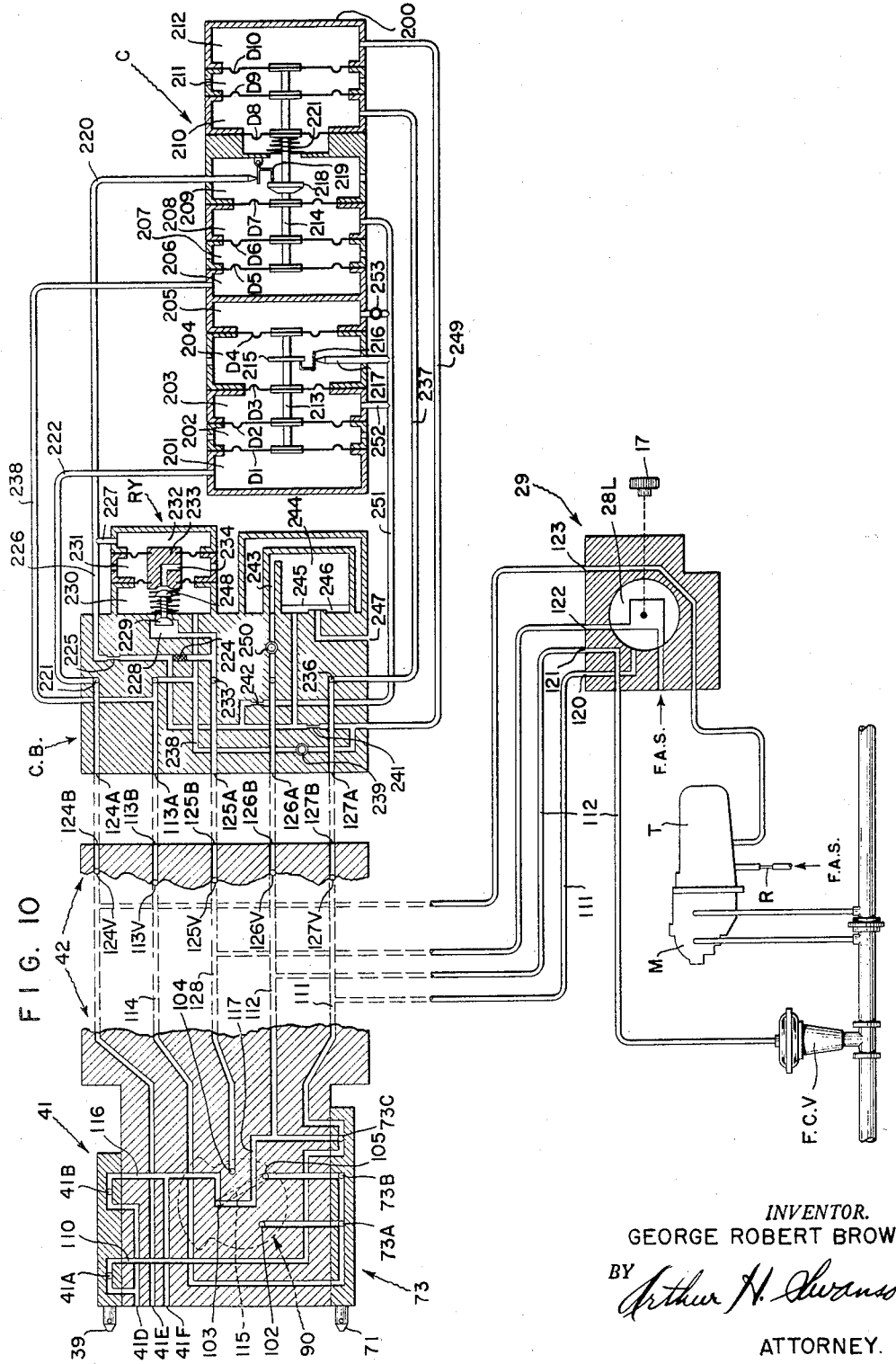

Nov. 10, 1959 G. R. BROWN 2,911,990
VALVE HAVING MANUAL AND AUTOMATIC MEANS FOR OPERATING IT
Filed May 27, 1955 8 Sheets-Sheet 7

INVENTOR.
GEORGE ROBERT BROWN
BY
ATTORNEY.

Nov. 10, 1959   G. R. BROWN   2,911,990
VALVE HAVING MANUAL AND AUTOMATIC MEANS FOR OPERATING IT
Filed May 27, 1955   8 Sheets-Sheet 8

| LEGEND: VALVE OPEN ○ | VALVE CLOSED ● |   |
|---|---|---|
| MANUAL CONTROL VALVE | 41 | |
| POSITION | 41A | 41B |
| SET POINT | ○ | ● |
| VALVE | ● | ○ |

| LEGEND: VALVE OPEN ○ | VALVE CLOSED ● | | |
|---|---|---|---|
| TRANSFER VALVE | 73 | | |
| POSITION | 73A | 73B | 73C |
| AUTO | ● | ○ | ● |
| SEAL | ○ | ● | ● |
| MANUAL | ○ | ● | ○ |

INVENTOR.
GEORGE ROBERT BROWN
BY *Arthur H. Swanson*
ATTORNEY.

United States Patent Office 2,911,990
Patented Nov. 10, 1959

2,911,990

VALVE HAVING MANUAL AND AUTOMATIC MEANS FOR OPERATING IT

George Robert Brown, Oreland, Pa., assignor to Minneapolis-Honeywell Regulator Company, Minneapolis, Minn., a corporation of Delaware Application May 27, 1955, Serial No. 511,489

10 Claims. (Cl. 137—82)

The general object of this invention is to provide means for automatically operating or for manually operating an air-operated final control valve or for manually shifting the control of this final control valve from automatic to manual operation or vice versa. Devices of this character are disclosed in U.S. Patent 2,666,585, patented January 19, 1954 to L. Gess.

The problem posed by the use of such mechanism is that modern industrial processes and the industrial plants in which they are carried out have become extremely complicated. Such complexity means that the number of variables which must be indicated and used by the operator or by a controller to control the process has become very great. Therefore, it is very difficult for an operator to comprehend them or to observe all the dials or indicators necessary to give him the information he requires to control the process. The operator is customarily located at a control location remote from the apparatus controlling the process. The indicators required to give him the information necessary are so large that they cannot be conveniently located on a control board or panel.

To meet this problem the size of the indicators and of the operating handles, which provide the means for operating the final control element, has been reduced. An example of such a miniature or reduced-size instrument is to be found in application for U.S. Patent, Serial No. 479,989, by Ira G. Reilly, filed January 5, 1955.

It is an object of this invention, therefore, to provide apparatus for controlling an industrial process which may be composed of one or more of a number of component parts which may be connected together like building blocks, the number of these parts being employed according to the complexity of the process under control.

A further object of this invention is to provide readily attachable-and-detachable connections between the operating handle and the controllers operated thereby so that the controllers may be removed from the control panel and from the operating handle and replaced or rearranged in different combinations.

Still another object of this invention is to provide a simple control valve adapted to be actuated by a cam.

Certain subject matter shown herein is not claimed herein but is claimed in applicant's joint application with James S. McChesney, Serial No. 511,606, now U.S. Patent No. 2,863,470.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 3 is a front elevation showing the front of the case by means of which the parts of this instrument are mounted on a vertical control board or panel;

Fig. 4 is an exploded, perspective view showing the rear of the instrument case with the chassis partially withdrawn and showing particularly one half of each of the readily attachable-and-detachable connections;

Fig. 5 is a perspective view (on a scale slightly reduced from Fig. 4) showing the air-pressure-regulator, the switch or transfer plate, two of the valves hereinafter referred to, and the other half of the readily attachable-and-detachable connections;

Figure 10A:
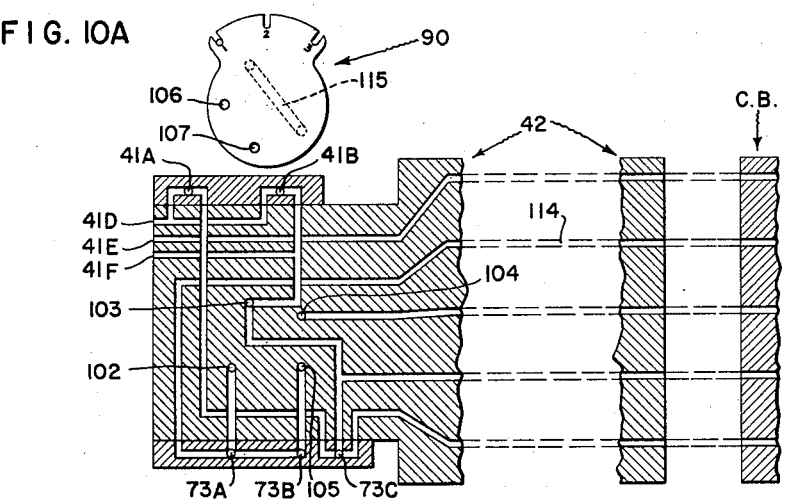
Fig. 10 is a diagrammatic or schematic view showing the component parts of this invention and the pneumatic circuits by which these parts are connected.
Figure 10B:
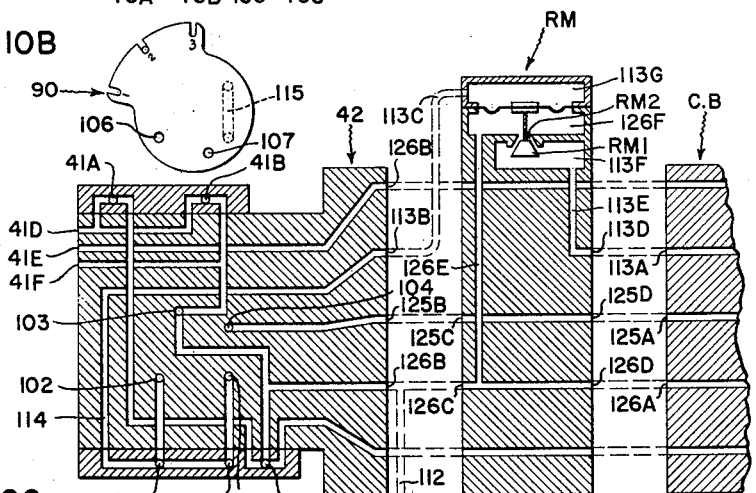
Figure 10C:
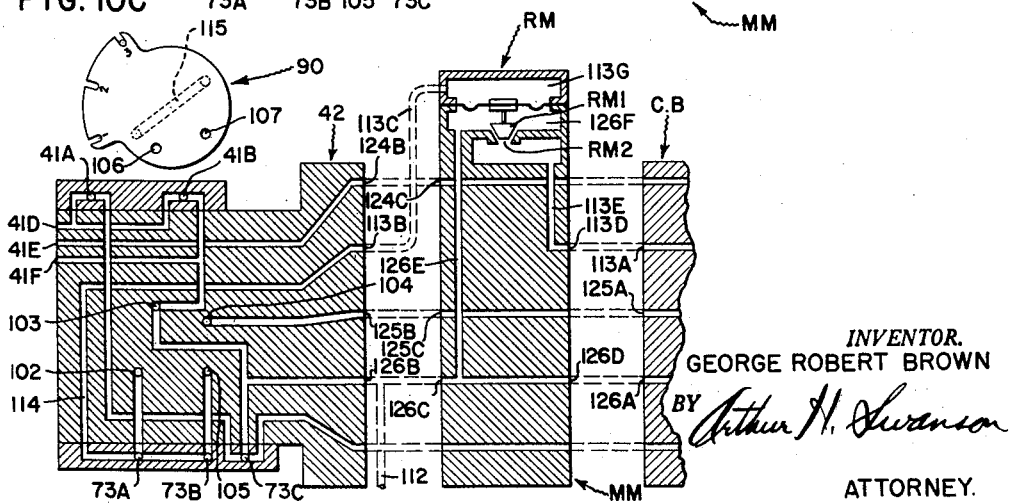
Figures 11, 12, 13:
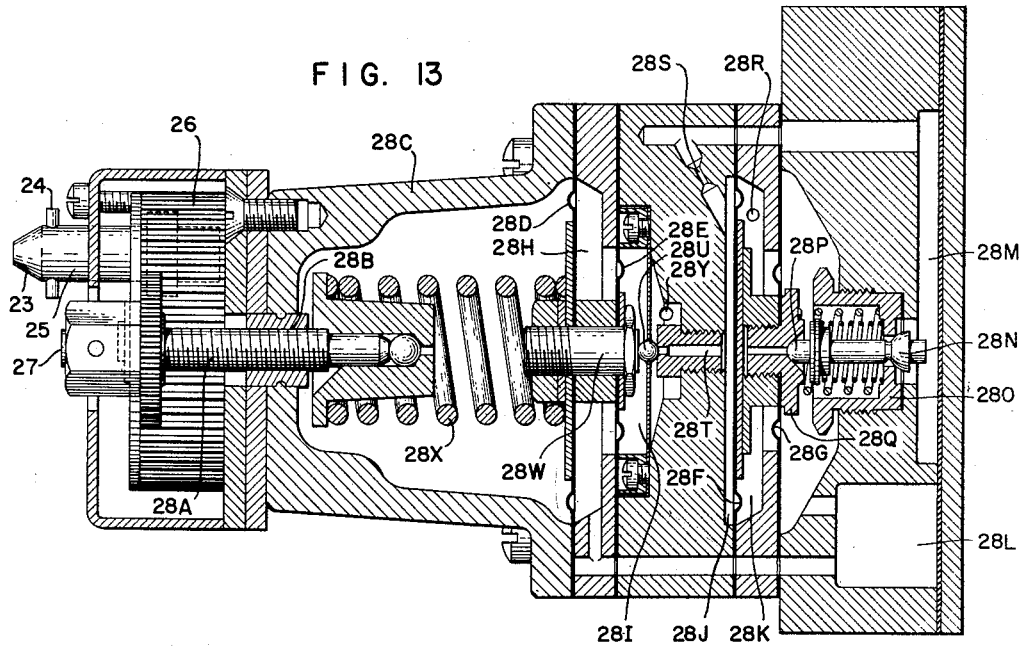

Figs. 10A, 10B, and 10C are diagrammatic or schematic views showing the circuit switch plate 90 in various positions;

Fig. 11 is a tabulation showing the positions which manual control valve 41 may assume;

Fig. 12 is a tabulation showing the positions which transfer switch 73 may assume; and Fig. 13 is a longitudinal cross section showing the pressure regulator.

*Automatically or manually controlled system*

Figure 1:
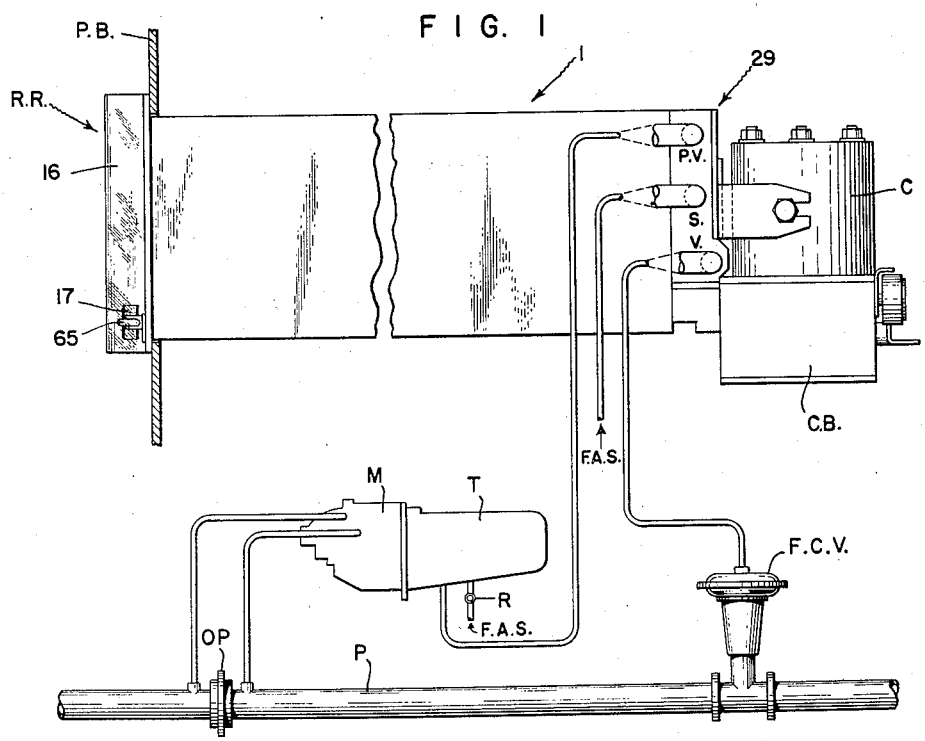
Fig. 1 is a diagrammatic or schematic view in side elevation showing the component parts, some or all of which may be connected together in various ways to form the mechanism of this invention.
Figure 2:
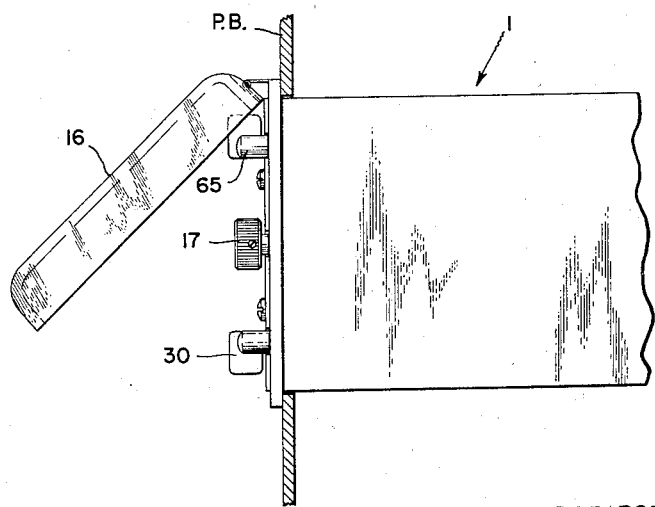
Fig. 2 is a fragmentary view showing a portion of the bottom of the case shown in Fig. 1.

Figs. 1 and 2 show the mechanism of this invention as applied to measuring, recording, and controlling the flow of fluid through a pipe. This showing is merely one example selected from the myriad forms which this mechanism may take. The process variable, in this case flow through pipe P, is measured by an orifice plate OP which transmits a differential pressure to the measuring instrument M, which may be a flexible diaphragm exposed on its opposite faces to the different pressures. Measuring instrument M actuates a transmitter T which may be a valve of the flapper-nozzle type connected to a filtered air supply F.A.S. by means of a restriction R. Transmitter T converts the process variable into an air pressure which varies in accordance with the variations in the process variable. This variable air pressure is conducted to an orifice PV in the regulator base 29 and, thence, through conduits in the regulator base 29 and in the controller base C.B. to the process variable chamber in the controller C.

A recorder R.R. is mounted in a rectangular orifice in vertical panel or control board P.B. and comprises a case, generally indicated at 1, a transparent door 16, a handle 30 (which actuates a manual control valve), a handle 17 (which actuates an air-pressure regulator), and a handle 65 (which actuates a transfer switch).

Controller C contains a relay to which compressed air is fed from a filtered air supply F.A.S. through an inlet orifice S in regulator base 29. The output air pressure from controller C passes through outlet orifice V in regulator base 29 to the final control valve F.C.V., which regulates the flow of fluid through pipe P.

Instead of being mounted directly on the rear of the recorder R.R., controller C may be mounted on the rear of the panel P.B. or may be mounted in the "field," or remote from the panel P.B. and adjacent the final control valve F.C.V.

When the system is in the Automatic position, the final control valve F.C.V. is under the control of the measuring instrument M. When the system is in Manual position, the final control valve F.C.V. is under the control of the air-pressure-regulator (shown in Fig. 5 at 28) manually actuated by handle 17.

A transfer switch 73 (the pneumatic circuit connections of which are shown in Figs. 10 and 12) provides means for manually transferring the governance of final control valve F.C.V. from Automatic to Manual position or vice versa. In Automatic position the output of regulator 28 is fed to the set point chamber of the controller C and thereby provides means for manually adjusting the set point of the controller. In Manual position the output of regulator 28 is fed to final control valve F.C.V. and thereby provides means for manually adjusting the position of valve F.C.V.

Recorder

Referring to Figs. 3, 4, 8 and 9, it will be seen that the recorder R.R. comprises a case formed by a four sided, elongated, box-like structure having an open front and open back. This case is generally indicated by the reference character 1 and comprises a top wall 2, a bottom wall 3, and side walls 4 and 5, of which the left hand side wall 5 is indicated in Fig. 4 in dotted and dashed lines. A portion of the top wall is formed by the detachable cover 6, shown removed in Fig. 4. Cover 6 is removable to provide ready access to permit the attachment and detachment of wires to terminal block 9. Across a portion of the open back of case 1 extends a strap on which is mounted a lug 7 having a hole 8 through it. Through this hole 8 electric wires (not shown) may be connected to terminal block 9 whence a cable 10 leads to wires 11 and 12. These wires conduct electricity to an electric motor (not shown) which forms the drive for the chart. Instead of metal wires, cable 10 may comprise a pair of hollow tubes adapted to conduct air, if a pneumatic motor is used to drive the chart. Cable 10 is coiled to permit movement of a shelf or chassis 13 which is slidably mounted in the bottom of case 1. Chassis 13 is shown in Fig. 4 as partially withdrawn to the left or front of the instrument.

Fig. 3 shows the front of the case which projects through an opening in the control board or panel (not shown in Fig. 3). The case has a vertically extending flange surrounding the edges of the opening in the control board or panel. Flange 14 has mounted on it, by means of hinges 15, a door 16 of transparent material. Door 16 cooperates with dust ledges forming parts of the flange 14 to close the front of the instrument substantially dust-tight.

Air pressure regulator

Fig. 3 shows, projecting from the center of the lower part of the front end of the case, a handle 17 adapted to actuate the air-pressure-regulator. Handle 17 is connected to shaft 18. Fig. 4 shows that shaft 18 carries at its rear end a readily-attachable-and-detachable connection comprised in part by a sleeve 19 having, at its rear, V-shaped or pointed ends 20 each separated by a slot 21 extending parallel to the axis of shaft 18. The axis of shaft 18 is designated in Figs. 4 and 5 by the dashed line 22. Fig. 5 shows the other half of the readily-attachable-and-detachable connection comprising the frustum 23 from which projects the pin 24 and which is connected by the cylinder 25 to the gears 26 which turn the actuator 27 for the air-pressure-regulator, generally indicated at 28, and mounted on block 29. This air-pressure-regulator is of well known construction and is disclosed in detail in Fig. 13.

Actuator 27 comprises a shaft rotated by gears 26 and having screw threads 28A on it which mate with screw threads 28B on regulator case 28C. Four flexible diaphragms 28D, 28E, 28F, and 28G divide the interior of regulator 28 into five compartments 28H, 28I, 28J, 28K, and 28L.

Compartment 28M is a fifth or inlet compartment and is the inlet to which compressed air is supplied from a filtered air supply. Compartment 28M is separated from output compartment 28L by an inlet valve comprised by hemisphere 28N and stationary valve seat 28O. Compartment 28L is separated from outlet compartment 28K by an exhaust valve comprised by hemisphere 28P and movable valve seat 28Q. Compartment 28K is vented to atmosphere by port 28R.

Inlet compartment 28M is connected to nozzle compartment 28J by a restriction and filter 28S. Nozzle 28T is controlled by flapper or ball valve 28U. When nozzle 28T is open, it communicates with compartment 28I which is vented to atmosphere by exhaust port 28Y.

Outlet compartment 28L communicates directly with feedback compartment 28H. A spring 28X is interposed between actuator 27 and rod 28W which is fastened to diaphragms 28D and 28E and bears on flapper 28U.

Operation of regulator

When handle 17 is turned manually, the pressure which spring 28X exerts on rod 28W is varied. The pressure of spring 28X is opposed by the pressure of the air in feedback chamber 28H. If these pressures are not equal, flapper 28U moves to close or to open nozzle 28T and thereby to vary the air pressure in nozzle compartment 28J. This variation in the air pressure applied to diaphragm 28F opens either inlet valve 28N—28O and admits air to output chamber 28L or opens exhaust valve 28P—28Q and exhausts air from output chamber 28L to atmosphere through chamber 28I and port 28Y.

Thus manual operation of handle 17 causes the output pressure in chamber 28L to vary. The ways in which this output pressure is utilized will be explained in detail hereinafter.

Manual control valve

Figure 8:
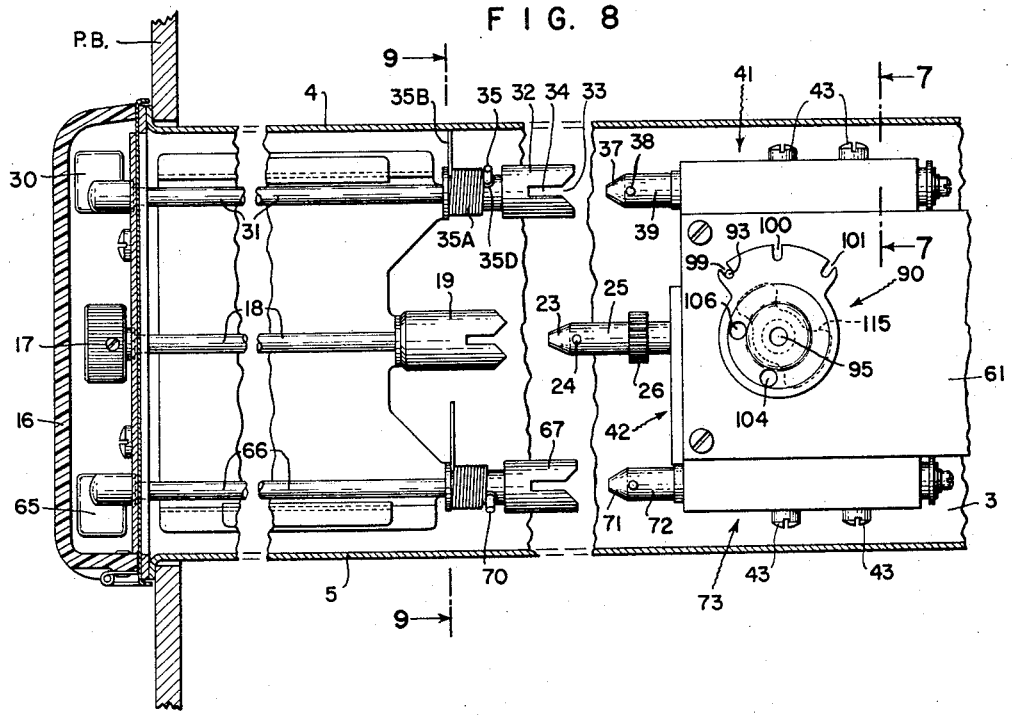
Fig. 8 is a top or plan of a portion of the recorder and the parts carried thereby. This view is broken away longitudinally to shorten it and some of the parts are shown in horizontal cross section.

Figs. 3 and 8 show a handle 30 projecting from the front of the case 1 at the lower left portion thereof adjacent the legends "Valve" and "Set Point." Handle 30 actuates a "Manual Control" valve (generally indicated at 41). Handle 30 is mounted on shaft 31 which terminates at its rear in an attachable-and-detachable connection of which one half is shown in Fig. 4. This half of the attachable-and-detachable connection comprises a sleeve 32 whose rear end is formed with V-shaped notches 33 each terminating in a slot 34.

Figure 9:
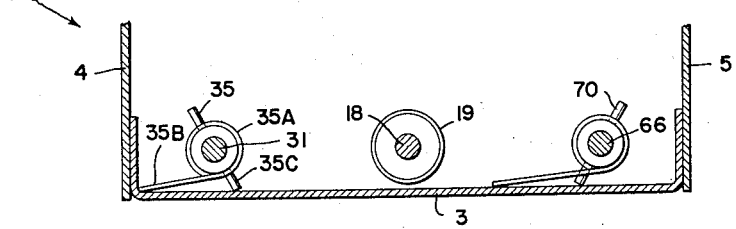
Fig. 9 is a vertical, transverse, cross section on line 9—9 of Fig. 8 viewed in the direction of the arrows.

Stops 35 are mounted on sleeve 32. Figs. 8 and 9 show a high-torsion spring 35A coiled around shaft 31 and attached at one end 35D to stop 35. The other end 35B of spring 35A bears against the bottom wall 3 of the case 1 and biases shaft 31 and handle 30 towards one end of their arc of travel.

The axis of shaft 31 is designated in Figs. 4 and 5 by the dashed line 36. Fig. 5 shows the other half of this attachable-and-detachable connection which comprises a frustum 37, pin 38, and a cam shaft 39, which enters the manual control valve 41. Valve 41 has a valve casing 46 and a flange or collar 40.

Figure 6:
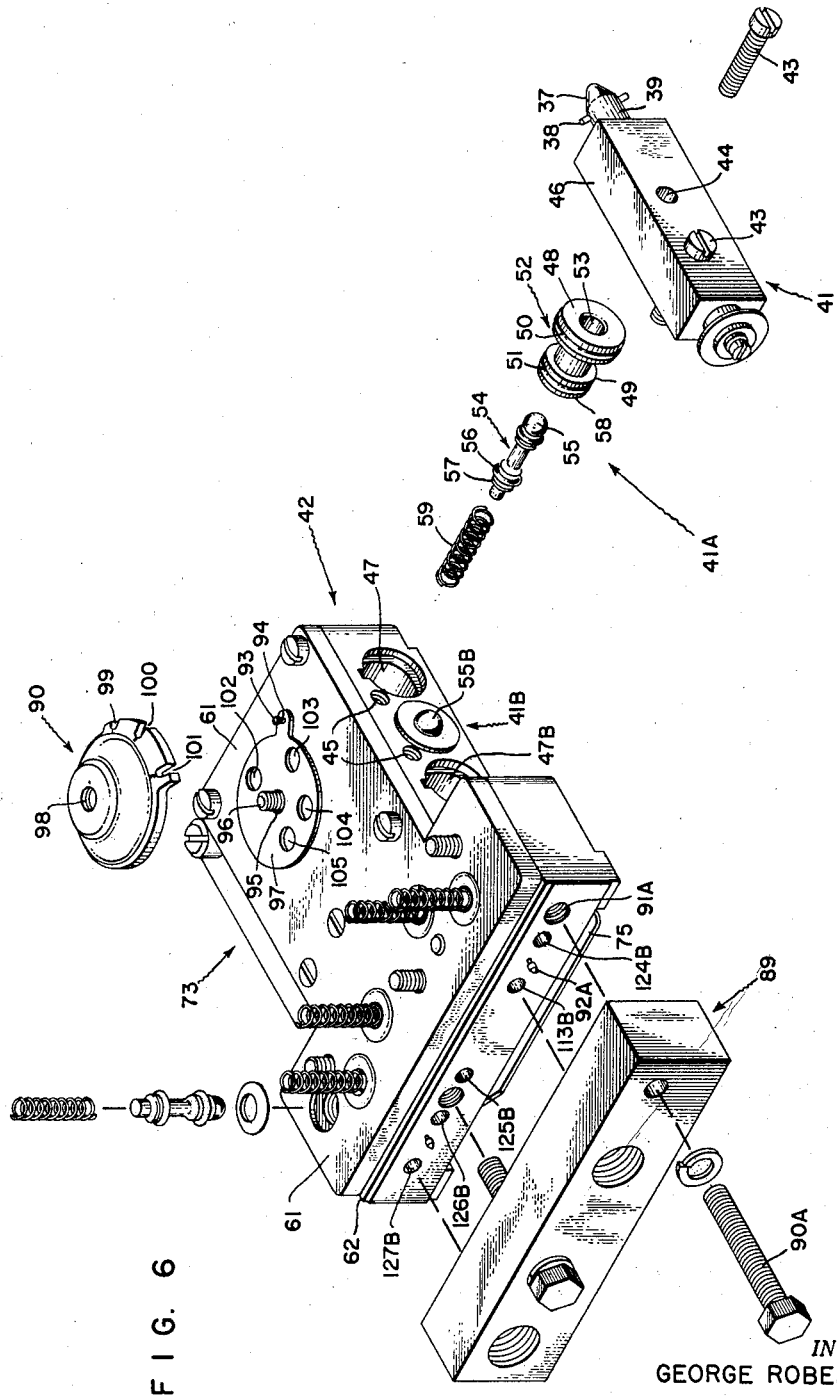
Fig. 6 is an exploded, perspective view showing the parts in a position turned 90 degrees counter-clockwise horizontally from Fig. 5 with the regulator base and the pressure regulator shown in Fig. 5 removed.

Figs. 5 and 6 show that the switch casing 46 is adapted to be secured to the side of the switch block (generally indicated at 42) by screws 43 which pass through holes 44 and into holes 45 in switch block 42.

Figure 7:
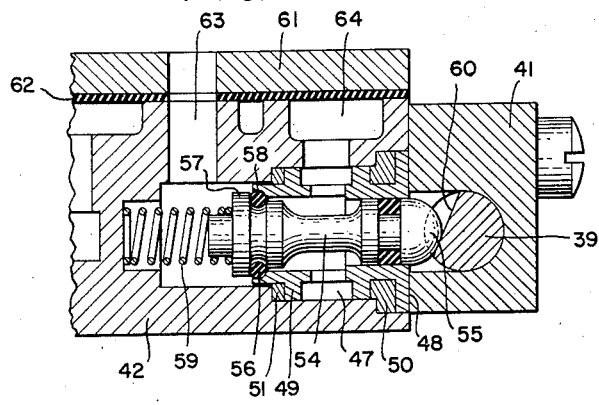
Fig. 7 is a vertical, transverse, cross section on line 7—7 of Fig. 8 viewed in the direction of the arrows.

Figs. 6 and 7 show that the "Valve-Set Point" valve 41 comprises a number of like air-controlling valves, only one of which will be described. Each of these valves comprises a valve bushing, generally indicated at 52, and adapted to enter a hole 47 in switch block 42. Bushing 52 comprises a large flange 48 and a small flange 49. A large gasket 50 is mounted on large flange 48 and a small gasket 51 is mounted on small flange 49. Bushing 52 has a hole 53 passing axially through it. Valve stem 54 is mounted in hole 53 and has an actuating head or ball 55 at one end thereof, a flexible O-ring 56, and a flange 57 stressing against O-ring 56 adjacent the other end thereof. O-ring 56 is biased into engagement with valve seat 58 on the left end of bushing 52 by spring 59. Spring 59 also biases head 55 into engagement with cam 39 which has one or more flattened portions 60 thereon.

Switch block 42 has switch block plate 61 secured to it and sealed by means of gasket 62. Conduits 63 and 64 (Fig. 7) extend through switch block 42 and are adapted to be placed in communication or cut off from communication by means of O-ring 56 and valve seat 58. Fig. 6 shows that cam shaft 39 may cooperate with more than one valve. For example, in Fig. 6 two such valves are shown. Valve 41A comprising elements 47–59, as described, and valve 41B having an operating head 55B and identical in all respects with valve 41A. A cavity 47B in adapter block 42 is adapted to receive a third valve in all respects identical with that shown as elements 47–59, inclusive, if desired.

*Circuit switching plate*

Figs. 5, 6 and 8 show the physical structure and Figs. 10, 10A, 10B and 10C show the pneumatic circuitry of the circuit switching plate. This circuit switching plate is generally indicated by the reference character 90. Switch block 42 has a switch block plate 61 secured thereto by means of screws and is sealed air tight by means of gasket 62. On its upper surface, switch block plate 61 has a positioning pin 93 which has an enlarged head and an under cut or portion of reduced diameter 94. A screw 96 passes through a vertical hole in switch block 42, gasket 62, and switch block plate 61 and screws into threads in a hole 98 in the circuit switching plate 90.

Positioning pin 93 secures a gasket 97, having a central hole 95 therein, to the upper surface of the switch block plate 91. Screw 96 has a screw-driver slot in its lower end (not shown) so that it can be loosened to permit circuit switching plate 90 to be turned. Circuit switching plate 90 has in its edge or rim three notches 99, 100, and 101. Positioning pin 93 is adapted to enter one of the notches 99, 100, or 101, and thus position circuit switching plate 90 with relation to the holes 102, 103, 104, or 105 in the gasket 97. Figs. 10A, 10B and 10C show that circuit switching plate 90 has through it, in addition to central, vertical hole 98 two additional vertical holes 106 and 107. Plate 90 also has a sealed recess 115 in the lower face thereof. Recess 115 is adapted to connect the holes 102, 103, 104, and 105 together in various combinations as shown in Figs. 10, 10A, 10B, and 10C.

*Operation of circuit switching plate*

Figs. 10 and 10A show the circuit switching plate 90 in the first position in which pin 93 occupies slot 99. In this first position, the output of controller C is fed to final control valve F.C.V. and, simultaneously, to the reset chamber of the controller C. The output of controller C passes from relay RY and through the outlet orifice 113A in the controller base C.B. to the inlet orifice 113B in switch block 42, thence through conduit 114 to valve part 73B of the transfer switch 73. When the transfer switch 73 is in Automatic position, valve part 73B is open so that the output of controller C passes from valve part 73B, orifice 105 in gasket 97, sealed recess 115 in circuit switching plate 90, to orifice 103 in gasket 97. From orifice 103, the output of controller C passes through conduits 117 and 112 in switch block 42 and out outlet orifice 126B into inlet orifice 126A in controller base C.B. to the inlet to the controller reset chamber. Simultaneously, the output of controller C passes through conduit 112 to final control valve F.C.V.

In Fig. 10B the circuit switching plate 90 is shown in the second position in which air is supplied to the motor of a bypass relay when the device is in Automatic position.

In the second position, a manifold MM is interposed between the switch block 42 and the controller base C.B. Manifold MM has a bypass relay RM forming part of it.

Relay RM connects the output of controller C to the final control valve F.C.V. and to the feedback circuit, when the system is in Automatic position, or disconnects the output of controller C from the final control valve F.C.V. and from the feedback circuit, when the system is in Manual position.

Relay RM does this by closing off the circuit which may be traced from outlet orifice 113A in controller base C.B. through inlet 113D in manifold MM, conduit 113E in manifold MM, inlet chamber 113F in relay RM, through the conduit controlled by movable valve member RM1 and valve seat RM2, outlet chamber 126F, conduit 126E in relay RM and in manifold MM, outlet orifice 126C in manifold MM, inlet orifice 126B in switch block 42, and conduit 112 to final control valve F.C.V.

When the transfer switch 73 is in the Automatic position, valve part 73A is closed but valve part 73B is open. Therefore, supply air from the controller base C.B. passes out the outlet port 125A, into the inlet port 125B and through a conduit to the port 104 in gasket 97, sealed recess 115 in circuit switching plate 90, port 105 in gasket 97, valve part 73B (which is open), conduit 114 in switch block 42, outlet orifice 113B, and conduit 113C to motor chamber 113G of relay RM.

Relay RM closes communication between the output of controller C and the final control valve F.C.V. in the following manner. When the transfer switch 73 is in Manual position, the valve part 73A is open and the valve part 73B is closed. Therefore, the supply of air from outlet orifice 125A in controller base C.B. is closed by valve part 73B and the circuit traced above. However, since valve part 73A is open, the air in motor chamber 113G passes through conduit 113C, inlet orifice 113B, conduit 114, valve part 73A (which is open) to port 102 in gasket 97, which is aligned with port 106 in circuit switching plate 90. In consequence, the air in motor chamber 113G is vented to atmosphere and the valve constituted by movable valve member RM1 and stationary valve seat RM2 is closed, closing off communication between the inlet chamber 113F and the outlet chamber 126F of the transfer relay RM.

Fig. 10C shows a system very similar to that illustrated in Fig. 10B and in which the bypass relay RM opens or closes communication between the controller output and the final control valve F.C.V. In Fig. 10C, however, the bypass relay RM is of the type which closes when air is applied to its motor chamber 113G and which opens when air is vented to atmosphere from its motor chamber 113G. When the transfer switch 73 is in the Automatic position, valve part 73A is closed and valve part 73B is opened. Air from the motor chamber 113G of bypass relay RM is vented to atmosphere through conduit 113C, inlet orifice 113B, conduit 114, valve part 73B, port 105 in gasket 97, and port 107 in circuit switching plate 90.

Bypass relay RM closes off communication between the output of controller C and the final control valve F.C.V. in the following manner. Air from supply inlet 125A in controller base C.B. passes through inlet 125B, port 104 in gasket 97, sealed recess 115 in circuit switching plate 90, port 102 in gasket 97, conduit 114, valve part 73A (which is open), conduit 114, outlet orifice 113B and conduit 113C to motor chamber 113G. The pressure of this air in motor chamber 113G causes movable valve part RM1 to engage stationary valve seat RM2 and to thereby close off communication between inlet chamber 113F and outlet chamber 126F of the bypass relay RM.

Transfer valve

Figs. 5, 6, 7 and 8 show the structure and Figs. 10, 10A, 10B, and 10C show the circuit connections of the transfer valve 73. The function of transfer valve 73 is to transfer the governance of the final control valve F.C.V. from the Automatic position, in which the final control valve is under the control of the measuring instrument M, to the Manual position, in which the final control valve F.C.V. is under the control of the manually operated pressure regulator 28.

Fig. 3 shows that the recorder R.R. includes a manually operable handle 65. Handle 65 has three positions Auto (automatic), Seal, and Manual. Handle 65 (Fig. 8) actuates a shaft 66, a readily-attachable-and-detachable connection 67 and cam shaft 71 having flat surfaces thereon similar to flat surface 60 on cam shaft 39 of manual control valve 41, as shown in Fig. 7. Transfer valve 73 is made up of three valve parts 73A, 73B and 73C. These valve parts are identical with the air controlling valve (generally indicated at 52) forming part of manual control valve 41 and illustrated in detail in Figs. 6 and 7. Cam shaft 71 has a pin 72 through it.

Operation of transfer valve

The way in which the transfer valve 73 performs its function of switching control of the final control valve from Automatic to Manual position or vice versa without disturbing the position of the final control valve and consequently without a "bump" or disturbance of the process under the control of the final control valve, is as follows. Figs. 10 and 12 show that when the system is in Automatic position, air is transmitted from the measuring instrument M and the transmitter T through pipe 123 and check valve 124V, inlet orifice 221, and pipe 222 to chamber 201 of controller C. The operation of the controller C will be explained hereinafter under the heading Controller. The output of controller C passes out outlet orifice 113A in controller base C.B. through inlet orifice 113B in switch block 42, thence through check valve 113V and conduit 114 to valve parts 73A and 73B. In Automatic position, valve part 73A is closed but valve part 73B is opened. Therefore, air from conduit 114 passes through hole 105, sealed recess 115, and hole 103 to conduits 116 and 117. Conduit 116 conducts air to valve part 41B and, when valve part 41B is opened, to the outlet 41D in switch block 42 and thence to the receiver (not shown) which actuates the pointer 41P. Simultaneously, conduit 117 conducts the output of controller C to valve part 73C (which is closed and therefore blocks passage from air at this point), and to conduit 112, check valve 126B, reset restriction 250, and conduit 243 to chamber 244 of the reset relay forming part of the controller C. Reset relay 244, 245 and 246 transmits air through restriction 241 and conduit 249 to the positive feedback chamber 212 of the controller C.

When it is desired to switch from the Automatic position, described in the preceding paragraph, handle 65 is actuated to turn transfer valve 73 into the Seal position. In the Seal position valve part 73A is open, valve part 73B is closed, and valve part 73C remains closed. Since valve part 73A is blocked at hole 202, the output of controller C is cut off because valve part 73B now is closed also. The operator next reads the pressure indicated by pointer H1 on scale H2 which forms the horizontal pressure gauge shown in Fig. 3 adjacent the top. The operator next turns the handle 17 which operates the air-pressure-regulator 28. This causes the output of the air-pressure-regulator to escape from the output chamber 28L in the regulator base 29 through outlet orifice 120, conduit 111, check valve 127V, inlet orifice 236, and conduit 237 to chamber 210, which is the set point chamber of the controller C. This causes the pressure presently applied to the final control valve F.C.V., which is the pressure which was last put out by the controller C before it was cut off by the final control valve F.C.V., to very nearly equal the output pressure of the regulator 28. In many cases the handle 65 can be manually operated to switch the process from Seal to Manual position. For those applications where extreme accuracy and absolutely bumpless shifting is required, the following steps should be carried out after the steps outlined above.

Handle 35 is turned to Valve position and any movement of the right hand pointer 47P is noted. If pointer 47P moves, handle 30 is returned to Set Point position and handle 17 is manually operated to vary the output of pressure regulator 28 until no movement of the right hand pointer 41P occurs when handle 30 is switched from Set Point to Valve position. Output of pressure regulator 28 is then exactly equal to the pressure applied to the final control valve F.C.V.

Handle 65 can then be operated to turn valve 73 from Seal to Manual position. The process is now on manual control. Operation of handle 17 causes movement of the final control valve F.C.V. The air pressure applied to the final control valve F.C.V. is indicated by pointer P as well as by pointer H1.

To switch from Manual to Automatic operation the sequence of operations is substantially the reverse of that explained above. This reverse sequence of operation is as follows. Handle 65 is turned to move transfer valve 73 from Manual to Seal position. This closes valve part 73C but leaves valve part 73A open and valve part 73B closed.

The operator then manually adjusts handle 17 to vary the output of regulator 28 and thereby causes the set point pressure (indicated by pointer 41P) to equal the process variable pressure (indicated by pointer H1).

Operation of manual control valve

The operation of the manual control valve 41 is to connect the pointer 41P so that the pointer 41P normally indicates the output pressure of the regulator 28. When the transfer valve 73 is in Automatic position and the manual control valve 41 is in Set Point position, the output pressure of regulator 28 is applied to the set point chamber of controller C. When the transfer valve 73 is in Manual position and the manual control valve is in Set Point position, the output pressure of regulator 28 is applied to the final control valve F.C.V.

When the transfer switch 73 is in Automatic position, the manual control switch 41 may be turned to Valve position by turning handle 30 against the spring which biases it. In Valve position the manual control valve causes the pointer 41P to indicate the output pressure from the controller C which is the pressure being applied to the final control valve F.C.V.

The circuit connections which permit these connections to be made are as follows:

When the transfer switch 73 is in Automatic position and the manual control valve 41 is in Set Point position, the output pressure of regulator 28 passes from output chamber 28L in regulator base 29 through outlet orifice 120, conduit 111, past valve part 73C (which is closed), through conduit 110 to valve part 41A (which is open) and out outlet port 41D in switch block 42 to the receiver (not shown) which actuates pointer 41P.

When the transfer valve 73 is in Manual position and the manual control valve 41 is in Set Point position, the pointer 41P continues to indicate the output pressure from the regulator 28 by means of the circuit traced in the preceding paragraph. However, since the valve part 73C is now open, the output pressure from regulator 28 also passes from conduit 111 through valve part 73C and conduit 112 to the final control valve F.C.V.

When the transfer valve 73 is in the Automatic position and the manual control valve 41 is in the Valve position, the output air from controller C passes from chamber 230 of relay RY through conduit 238, outlet orifice 113A, inlet orifice 113B, conduit 114, valve part 73B (which is open), hole 105, and sealed recess 115 to hole 103. One portion of the output air from controller C passes from hole 103 through conduit 116, valve part 41B (which is open) and out outlet orifice 41D to the receiver (not shown) which actuates pointer 41P. Simultaneously, another portion of the output air from controller C from hole 103 through conduits 117 and 112 to valve F.C.V. At the same time, the output air from regulator 28 is prevented from operating pointer 41P because valve part 41A is closed.

*Controller*

The controller, generally designated C in Figs. 1 and 10, comprises a rigid casing 200 divided into twelve compartments 201–212 by ten diaphragms D1–D10.

As shown in Fig. 1, controller C is adapted to be mounted on controller base C.B. A measuring element M and an air-operated transmitter T transmit air at a pressure, which varies in response to the variations in the measured variable sensed by the measuring element M, through an inlet orifice 221 and an inlet conduit 222 to chamber 201, which is called the process variable chamber.

When the system is in Automatic position, manually operated pressure regulator 28 transmits air through inlet orifice 236 and conduit 237 to chamber 210, which is called the set point chamber.

Air from a filtered air supply enters controller base C.B. through inlet conduit 233 and passes through filter 224 and restriction 225 through pipe 226 to nozzle 220. A short pipe 227 connects pipe 226 and nozzle 220 to the motor chamber 232 of the relay RY.

Diaphragms D5–D10 are connected together by rod 214. The pressure in chamber 208 acts on rod 214 in the opposite direction to the pressure in chamber 210. Therefore, if there is a difference between the pressure in chamber 208 and the pressure in chamber 210, rod 214 is moved longitudinally in one direction or the other. Such movement of rod 214 causes enlargement 218 to rock flapper 219 about its pivot and therefore varies the escape of air from nozzle 220. The pressure of the air escaping through nozzle 220 is fed through pipe 227 to motor chamber 232 of relay RY. Any change in pressure in motor chamber 232 causes inlet valve 229 or outlet valve 248 to open. If inlet valve 229 opens, air is fed from inlet orifice 224 and relay chamber 228 to relay chamber 230. If outlet valve 248 opens, air escapes from relay chamber 230 through outlet conduit 234 and chamber 231, which is vented to atmosphere.

Pressure in chamber 230 thus constitutes the output pressure of the controller and is fed through outlet orifice 113A through the circuits which have already been described.

The output pressure of controller C is fed from output chamber 230 through conduit 238 to chamber 206, which is called the negative feedback chamber. The output pressure of the controller C is also fed through conduit 238 through restriction 239 which forms the throttling range or proportional band adjustment of the controller C.

From the output side of restriction 239 the air is fed through conduit 249 to chamber 212, which is the positive feedback chamber.

Air from a filtered air supply is fed through inlet orifice 233, filter 224, and a conduit to restriction 240 and restriction 241 in series. The conduit between restrictions 240 and 241 is connected to chamber 246 of the reset unit. Air from inlet orifice 226A passes to chamber 244 of the reset unit through a reset restriction 250. The pressure of the air in chamber 244 causes diaphragm 245 to control the exhaust of air from chamber 246 through an exhaust port 247 bleeding to atmosphere. The pressure in chamber 246 is fed through restriction 241 and pipe 249 to the positive feedback chamber 212.

Air from a filtered air supply enters through inlet orifice 233 and passes through filter 224, restriction 242 and pipes 251 and 252 to chamber 203 and to nozzle 217 and, through rate restriction 253, to chamber 205 and, through pipe 251, to chamber 208.

Chamber 202 is vented to atmosphere and is merely a sealing chamber. Shaft 213 connects diaphragms D1–D4 together so that the movement of shaft 213 causes enlargement 215 to rock flapper 216 about its pivot. Flapper 216 controls the pressure in nozzle 217. The pressures in chambers 203 and 205 oppose the pressure in chamber 201. Consequently, any variation in the process variable pressure applied to chamber 201 causes a variation in the nozzle pressure in nozzle 217. This variation in nozzle pressure in 217 is applied immediately to chamber 203 and, after a delay imposed by the rate restriction 253, to chamber 205. This causes a delayed negative feedback to balance the pressure in chamber 201. This is known as rate action. The pressure applied to chamber 208 is consequently a process variable pressure as varied by the rate action and may be called the process variable pressure plus the rate pressure.

Chambers 207, 209, and 211 are vented to atmosphere. The pressure in chamber 206 opposes the pressure in chamber 212 and the pressure in chamber 208 opposes the pressure in 210. If the pressures in the chambers 206–212 are all equal, the controller is in a balanced position. If now the pressure in chamber 208 changes from the pressure in chamber 210, the pressure in nozzle 220 is varied, the relay RY is actuated, and the output pressure of the relay RY is fed through conduit 238, restriction 239, and conduit 249 to chamber 212, which is the positive feedback chamber. Simultaneously, the output pressure of the relay RY is fed through conduit 238 to chamber 206, which is the negative feedback chamber. Therefore, a change in these pressures will continue until the pressure in chamber 208 is made to balance the pressure in 210. When the pressures in the conduits 206, 208, 210, and 212 are equalized, the controller C again resumes its normal or balanced condition.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. Mechanism for automatically or manually operating an air-operated final control valve or for manually shifting the control of said valve from manual to automatic operation or vice versa, including, a case comprising a box adapted to be mounted in an orifice through a vertical control board or panel, a pressure regulator mounted on said case and comprising a first handle projecting through the open front of said case, a first shaft actuated by said handle, a first readily attachable-and-detachable connection actuated by said shaft and providing an operating connection between said pressure regulator and said handle, a manual control valve comprising a second handle projecting through the open front of said case, a second shaft, a second readily attachable-and-detachable connection connected to said shaft, a spring biasing said connection and said shaft and said handle to one end of its arc of travel, and a switch casing having a plurality of conduits for conducting air through it, a valve stem in each of said conduits and adapted to open said conduit for the passage of air through it or to close said conduit, a transfer switch comprising a third handle projecting through the open front of said case, a third shaft connected to said handle, a third readily attachable-and-detachable connection connected to said third shaft, a spring biasing said third connection and said third shaft and said third handle to one end of their arc of travel, a third switch casing having a plurality of conduits for conducting air through it, and a valve stem in each of said conduits and adapted to open said conduit for the passage of air through it or to close said conduit, a circuit switch block having a plurality of conduits through it each communicating with one of the valve-controlled conduits, a perforated gasket mounted on said switch block and aligned with the perforations therein, a circuit switching plate engaging at one face with said circuit switching plate gasket and having a sealed recess in it adapted to be adjusted to various positions aligned with various of the conduits passing through said gasket, a screw securing said circuit switching plate in a selected position, and a positioning pin engaging said circuit switching plate and retaining it in the selected position.

2. Air-operated means for actuating an industrial process, including, an air-pressure-operated final control valve, means adapted to automatically vary an air pressure in accordance with changes in a controlling condition, a manually adjustable air-pressure regulator for maintaining a second air pressure varying in accordance with the adjustment of said regulator, a transfer valve manually adjustable between one position in which said first mentioned air pressure is transmitted through said transfer valve to said final control valve and a second position in which said second air pressure is transmitted through said transfer valve to said final control valve, said transfer valve, in moving between said one and said second positions, passing through an intermediate position in which neither of said pressures is transmitted to said final control valve, said valve having a bleed port connected to it, and a circuit switching plate connected to said transfer valve and adjustable to close said bleed port or to open it according to the position in which said plate is placed.

3. In a pneumatic telemetering system, an orifice plate adapted to produce different pressures in a fluid flowing through it, a measuring element operable in response to said different pressures, a transmitter operable by movements of said measuring element to produce a variable output air pressure, an air-operated controller connected to said transmitter and operable by variations of the output air pressure from said transmitter, a manually operable air-pressure regulator, an air-pressure-operated final control valve, a connection between said controller and said final control valve, a connection between said regulator and said final control valve, a transfer valve located in said connections and manually operable to open one of said connections and to close the other or vice versa, a bleed port communicating with said transfer valve, and a circuit switching plate having an opening through it and adapted to connect said bleed port to atmosphere or to close off said bleed port depending upon the position in which said circuit switching plate is located.

4. The combination with an air-pressure-operated final control valve of, automatic means to automatically adjust the pressure of a supply of air in response to variations in the value of a variable condition, a manually operable air-pressure regulator adapted to vary the pressure of a supply of air, a transfer valve separate from said regulator and operable to connect said final control valve with either the air adjusted by said automatic means or with the air varied by said regulator, gauge means to indicate the value of the pressure impressed on said final control valve, a manual control valve manually operable to connect said gauge to the pressure impressed on said final control valve or to the pressure put out by said automatic means, and a circuit switching plate having a bore through it and adjustable to connect said transfer valve to atmosphere or to close off said transfer valve from atmosphere depending upon the position to which said circuit switching plate is located.

5. In an air-pressure-operated control system, automatically operating means varying an air pressure in accordance with changes in a control condition, an air-pressure-operated final control valve, a manually adjustable air-pressure regulator for maintaining a second air pressure varying in accordance with the adjustment of said regulator, a transfer valve manually adjustable between one position in which said first mentioned air pressure is transmitted through said valve to said final control valve and a second position in which said second air pressure is transmitted to said transfer valve to said final control valve, a bleed port connected to said transfer valve, and a circuit switching plate having a bore through it adapted to connect said bleed port to atmosphere when said circuit switching plate is located in one position and to shut off said bleed port from atmosphere when said circuit switching plate is located in another position.

6. In a pneumatic telemetering system, a measuring element adapted to deflect to different positions in accordance with the variations in a variable quantity, a transmitter adapted to maintain an air pressure varying in predetermined accordance with the deflection of said measuring element, a controller including a valve forming a continuous bleed to atmosphere, a fixed restriction through which air is supplied under constant pressure to said valve means, a process variable chamber having a flexible wall and connected to the air pressure put out by said transmitter so as to be operated thereby, a connection between the flexible wall of said process variable chamber and said valve whereby said valve is adjusted by said flexible wall to increase or decrease the air pressure put out by said valve as said measuring element deflects in one direction or the other, a negative feedback chamber connected to the pressure from said valve and having a flexible wall which moves in one direction or the other as the pressure from said valve increases or decreases, connections between the flexible wall of said negative feedback chamber and said valve and adapted to adjust said valve on such movement in the direction tending to neutralize the change in pressure put out by said valve, an air-pressure-operated relay having a motor chamber connected to said valve so as to be operated in accordance with the variations in the air pressure as changed by said valve, said relay having inlet and exhaust ports operated by said motor chamber so as to vary a relay output air pressure, an air-pressure-operated final control valve, a connection between said relay output pressure and said final control valve, a manually operable handle, an air-pressure regulator, a readily-attachable-and-detachable connection between said handle and said regulator, whereby said regulator may be attached to or detached from said handle, a connection between the output of said regulator and said final control valve, and a transfer valve located in the connections between said relay output chamber and said final control valve and in the connections between said regulator and said final control valve and adapted to close one and open the other and vice versa.

7. In a pneumatic telemetering system, a measuring element including a diaphragm adapted to deflect in accordance with variations in the differential of two pressures impressed on said diaphragm, a transmitter creating an air pressure varying in predetermined accordance with changes in said pressure differential, a controller including a process variable chamber having a flexible wall and connected to said air pressure so as to be moved in response to the changes therein, valve means forming a variable bleed to atmosphere, a fixed restriction through which air is supplied under constant pressure to said valve means, a connection between said flexible wall and said valve means whereby said valve means is adjusted to increase or decrease said pressure as said flexible walls deflect in one direction or the other, a negative feedback chamber connected to the pressure controlled by said valve, and having a flexible wall connected to said valve and adapted to move said valve in the opposite direction to that in which said valve is moved by the pressure in said process variable chamber, a reset restriction connected to the air pressure controlled by said valve, a reset unit having a chamber having a diaphragm as a movable wall thereof and connected to the opposite side of said reset restriction, a reset unit valve actuated by said diaphragm and operable thereby to control the pressure of a supply of air, a positive feedback chamber connected to said supply of air and having a flexible wall connected to said valve and adapted to actuate said valve in the same direction as said valve is actuated by the changes in pressure in said process variable chamber, an air-operated final control valve, a connection between the controller and said final control valve, a manually operable air-pressure regulator located remotely from said controller and from said final control valve, a connection between said regulator and said final control valve, a gauge for measuring and exhibiting an air pressure and located adjacent said regulator, a transfer valve located in the connections between said controller and said final control valve and in the connections between said regulator and said final control valve and manually operable to close one and to open the other or vice versa.

8. In a pneumatic telemetering system, a transmitter including an element adapted to deflect into different positions in accordance with the variations in a variable quantity and to vary an air pressure in accordance with said variations, a first gauge connected to and operable by said air pressure for exhibiting the value of the variable quantity, a controller adapted to maintain an air pressure varying in predetermined accordance with deflection of said variable quantity, a valve forming a bleed to atmosphere, a fixed restriction through which air is supplied at a constant pressure to said valve, a process variable chamber having a flexible wall, connections between said transmitter and said process variable chamber to adjust said flexible wall in response to changes in pressure put out by said transmitter accordingly as said variable quantity changes, a negative feedback chamber having a flexible wall and connected to the pressure varied by said valve and adapted to expand and contract as the pressure varied by said valve changes, a connection between the flexible wall of said negative feedback chamber and said valve to adjust said valve on each such expansion or contraction in a direction tending to neutralize the change in the pressure giving rise to said movement, a second gauge located adjacent said first gauge and at a distance from said transmitter and from said controller, a manually operable air-pressure regulator, a final control valve, a connection between said regulator and said final control valve, a connection between the output of said controller and said final control valve, and a manual control valve operable to connect said second gauge either to the pressure applied to the final control valve or to the output pressure from said controller.

9. In a pneumatic telemetering system, a measuring element adapted to deflect into different positions in accordance with variations in a variable quantity, a transmitter operable to maintain an air pressure varying in predetermined accordance with the variations in said variable quantity, a controller connected to and operated by said air pressure and adapted to maintain a second or output air pressure varying in predetermined accordance with the deflection of said element, valve means including a pair of cooperating valve elements for controlling said second or output air pressure, a process variable chamber having a flexible wall and connected to the variable air pressure from said transmitter so as to be operated thereby, a negative feedback chamber connected to said second or output air pressure and adapted to expand or contract depending upon the variations in said second or output air pressure, a manually operable air-pressure regulator, a connection between said regulator and said final control valve, a connection between said controller and said final control valve, a gauge located adjacent said regulator, a manual control valve in the connection between said regulator and said final control valve and in the connection between said controller and said final control valve and manually operable to connect said gauge to the pressure applied to the final control valve or to the pressure put out by said controller, a transfer valve in the connection between said controller and said final control valve and in the connection between said regulator and said final control valve and manually operable to open one and to close the other or vice versa, a bleed port connected to said transfer valve, and a circuit switching plate having a bore through it adapted to connect said bleed port to atmosphere when said circuit switching plate is located in one position and to close said bleed port when said circuit switching plate is located in another position.

10. In a pneumatic telemetering system, a measuring element adapted to deflect into different positions in accordance with variations in a variable quantity, a transmitter actuated by said element and adapted to vary air pressure, a controller adapted to maintain a second air pressure varying in predetermined accordance with the deflection of said measuring element, a process variable chamber having a flexible wall and connected to the pressure from said transmitter, a valve including a movable flapper and a relatively stationary nozzle forming a continuous bleed to atmosphere, a fixed restriction through which air is supplied at a constant pressure to said valve, mechanical and air-conducting connections between said process variable chamber and said flapper to adjust said valve in accordance with variations in the pressure in said process variable chamber to change said second pressure, a negative feedback chamber having a flexible wall and connected to the pressure controlled by said valve and adapted to expand and contract as the pressure controlled by said valve changes, mechanical connections between the flexible wall of said negative feedback chamber and said flapper to adjust said valve on each such expansion or contraction in a direction tending to neutralize the change in the pressure put out by said valve giving rise to such motion, a manually operable pressure regulator, a connection between said regulator and the final control valve, a connection between the output of said controller and the final control valve, a first gauge located adjacent said regulator and connected to and actuated by the pressure from said transmitter, a second gauge located adjacent said first gauge and said regulator, and a manual control valve in the connection between said regulator and said final control valve and in the connection between said controller and said final control valve and manually operable to connect said second gauge to the pressure applied to the final control valve or to the pressure put out from said controller.

References Cited in the file of this patent

UNITED STATES PATENTS

| | | |
|---|---|---|
| 557,274 | Kade | Mar. 31, 1896 |
| 702,131 | Green | June 10, 1902 |
| 1,542,030 | Bristol | June 16, 1925 |
| 1,971,187 | Jacobson | Aug. 21, 1934 |
| 2,198,455 | Mueller | Apr. 23, 1940 |
| 2,422,758 | Temple | June 24, 1947 |
| 2,658,516 | Luppold | Nov. 10, 1953 |
| 2,712,321 | Grogan | July 5, 1955 |
| 2,729,222 | Dickey | Jan. 3, 1956 |
| 2,731,023 | Panich | Jan. 17, 1956 |